(12) United States Patent
Yoneda et al.

(10) Patent No.: US 7,752,921 B2
(45) Date of Patent: Jul. 13, 2010

(54) MAGNETOSTRICTIVE TORQUE SENSOR

(75) Inventors: Atsuhiko Yoneda, Saitama (JP); Yasuo Shimizu, Saitama (JP); Yoshihiro Oniwa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 223 days.

(21) Appl. No.: 11/783,893

(22) Filed: Apr. 12, 2007

(65) Prior Publication Data
US 2007/0245833 A1    Oct. 25, 2007

(30) Foreign Application Priority Data
Apr. 19, 2006    (JP)    ............... 2006-115141

(51) Int. Cl.
*G01L 3/00* (2006.01)
(52) U.S. Cl. ................. 73/862.333; 361/93.1
(58) Field of Classification Search ................. 73/862.331–862.335; 361/91.3
See application file for complete search history.

(56) References Cited

U.S. PATENT DOCUMENTS

| | | | |
|---|---|---|---|
| 4,920,809 A * | 5/1990 | Yoshimura et al. ..... | 73/862.334 |
| 6,188,186 B1 * | 2/2001 | Kong et al. ................. | 318/118 |
| 6,422,095 B1 * | 7/2002 | Shimizu et al. ........ | 73/862.335 |
| 2004/0194559 A1 * | 10/2004 | Nakamura et al. ..... | 73/862.331 |
| 2006/0017413 A1 * | 1/2006 | Okamoto et al. ............ | 318/432 |
| 2006/0132083 A1 * | 6/2006 | Ueda et al. .................. | 318/798 |
| 2007/0034004 A1 * | 2/2007 | Cripe .......................... | 73/331 |
| 2008/0257069 A1 * | 10/2008 | Poirier et al. .......... | 73/862.191 |

FOREIGN PATENT DOCUMENTS

| | | |
|---|---|---|
| JP | 2004-239652 A | 8/2004 |
| JP | 2005-331453 A | 12/2005 |

\* cited by examiner

*Primary Examiner*—Lisa M Caputo
*Assistant Examiner*—Jonathan Dunlap
(74) *Attorney, Agent, or Firm*—Arent Fox LLP (57) ABSTRACT

A magnetostrictive torque sensor includes a shaft having a magnetostrictive film; a detection coil for detecting a change in a magnetic property of the magnetostrictive film; and a cutoff circuit for supplying an excitation signal for detecting the change in the magnetic property and inhibiting the excitation signal from being supplied to the detection coil for a predetermined interval from power on. The cutoff circuit cuts off the excitation signal I and its inverted signal to the bridge circuit.

12 Claims, 11 Drawing Sheets

FIG.2B
DETECTION COIL
SUPPLY VOLTAGE [V]

FIG.2C
GATE IC SUPPLY
VOLTAGE [V]

FIG.2D
CPU SUPPLY
VOLTAGE [V]

FIG.2E
EXCITATION SIGNAL I [V]

FIG.2F
POWER-ON
PERMISSION SIGNAL [V]

FIG.2G
DETECTION COIL
VOLTAGE [V]

FIG.2H
DETECTION COIL
CURRENT [A]

FIG.2I
DETECTION COIL
CURRENT [A]

FIG.5B DETECTION COIL SUPPLY VOLTAGE [V]

FIG.5C GATE IC SUPPLY VOLTAGE [V]

FIG.5D CPU SUPPLY VOLTAGE [V]

FIG.5E EXCITATION SIGNAL I [V]

FIG.5F DIFFERENTIATING CKT OUTPUT [V]

FIG.5G RIGHT FET DRIVE SIGNAL [V]

FIG.5H LEFT FET DRIVE SIGNAL [V]

FIG.5I DETECTION COIL VOLTAGE [V]

FIG.5J DETECTION COIL CURRENT [A]

FIG.7B
DETECTION COIL
SUPPLY VOLTAGE [V]

FIG.7C
GATE IC SUPPLY
VOLTAGE [V]

FIG.7D
CPU SUPPLY
VOLTAGE [V]

FIG.7E
EXCITATION SIGNAL I [V]

FIG.7F
RELAY DRIVE
SIGNAL [V]

FIG.7G
RIGHT FET
DRIVE SIGNAL [V]

FIG.7H
LEFT FET
DRIVE SIGNAL [V]

FIG.7I
DETECTION COIL
VOLTAGE [V]

FIG.7J
DETECTION COIL
CURRENT [A]

FIG.10B
DETECTION COIL
SUPPLY VOLTAGE [V]

FIG.10C
GATE IC SUPPLY
VOLTAGE [V]

FIG.10D
CPU SUPPLY
VOLTAGE [V]

FIG.10E
EXCITATION SIGNAL I [V]

FIG.10F
DETECTION COIL
VOLTAGE [V]

FIG.10G
DETECTION COIL
CURRENT [A]

FIG.10H
RIGHT FET
DRIVE SIGNAL [V]

FIG.10I
LEFT FET
DRIVE SIGNAL [V]

MAGNETOSTRICTIVE TORQUE SENSOR

CROSS REFERENCE TO RELATED APPLICATIONS

This application claims the foreign priority benefit under Title 35, United States Code, §119(a)-(d) of Japanese Patent Application No. 2006-115141, filed on Apr. 19, 2006 in the Japan Patent Office, the disclosure of which is herein incorporated by reference in its entirety.

BACKGROUND OF THE INVENTION

1. Field of the Invention

The present invention relates to a magnetostrictive torque sensor and particularly to a magnetostrictive torque sensor including a detection coil for detecting a magnetic property change of a magnetostrictive film to detect a torque.

2. Description of the Related Art

In an electric power steering device installed in a vehicle, a torque sensor detects a torque which is applied to a steering shaft by driver's steering. Thus, steering assist power is provided depending on torque signals output from the torque sensor. A magnetostrictive torque sensor is disclosed as such a torque sensor (See JP2004-239652A, FIG. 4 and JP2005-331453A, FIGS. 11 and 12). In this technology, a magnetostrictive film having magnetic anisotropy is attached on a surface of the shaft. When a torque is applied to the shaft from the outside, a magnetic permeability change in the magnetostrictive film corresponding to twisting force is detected as a change in impedance regarding a detection coil. Moreover, in technologies disclosed in JP2005-331453A, a pulse of excitation voltage is applied so that the change in the impedance of the detection coil is detected. In the technologies, the pulse of the excitation voltage is applied with a switching circuit so that a maximum of increasing current which flows in the detection coil is limited within a predetermined range.

SUMMARY OF THE INVENTION

An aspect of the present invention provides a magnetostrictive torque sensor comprising: a shaft having a magnetostrictive film; a detection coil for detecting a change in a magnetic property of the magnetostrictive film to detect a torque applied to the shaft; and a cutoff circuit for applying an excitation voltage for detecting the change in the magnetic property to the detection coil and cutting off the excitation voltage applied to the detection coil for a predetermined interval from power on of the magnetostrictive torque sensor.

The cutoff circuit may include a relay for cutting off a power for a bridge circuit that generates the excitation voltage. According to this structure, preferably, the excitation voltage is not generated for the predetermined interval because the relay cuts off the supply voltage to the bridge circuit.

A second aspect of the present invention provides a magnetostrictive torque sensor based on the first aspect, further comprising a bridge circuit including a plurality of switching elements responsive to an excitation signal for generating the excitation voltage, wherein the cutoff circuit cuts off the excitation signal supplied to the switching elements.

According to the second aspect, preferably, the cut off circuit stops operation of the switching elements for generating the excitation voltage. Thus, preferably, the excitation voltage is not applied to the detection coil for a startup interval.

A third aspect of the present invention provides a magnetostrictive torque sensor based on the first aspect, wherein the cutoff circuit responds to the power on which is performed by an ignition switch.

Preferably, the excitation voltage is not applied to the detection coil for the predetermined interval from when the ignition switch is turned on.

A fourth aspect of the present invention provides a magnetostrictive torque sensor based on the first aspect, further comprising a controller including a timer for generating the excitation signal, and supplying a permission signal to cause the cutoff circuit to permit to apply the excitation voltage to the detection coil when the predetermined interval measured by the timer elapses.

According to the fourth aspect of the present invention, preferably the magnetic property of the magnetostrictive film varies with a torque applied to the shaft. The magnetic property change can be detected as an inductance change in the detection coil. Further, an unstable status during power on can be prevented because the cutoff circuit stops applying an excitation voltage to the detection coil at least for the predetermined interval from the power on.

Preferably, the permission signal for permitting to transmit the excitation signal is supplied to the cutoff circuit when the predetermined interval elapses measured by the timer.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment of the present invention, the above-mentioned related art will be further explained.

In a case that the technology disclosed in JP2005-331453A is applied to an electric power steering device, when an ignition switch of a vehicle is turned on, the switching circuit for exciting the detection coil is unstable, so that a DC excitation voltage may be applied to the detection coil. Further, in a case that the switching circuit generates the excitation voltage having a rectangular waveform from a rectangular wave signal and its inverted signal, a high level signal and a low level signal are applied to the switching circuit for an interval from power on to generation of the rectangular wave signal by a CPU. As a result, the DC excitation voltage is applied to the detection coil for this interval.

Due to application of the DC excitation voltage, a saturation current determined by an internal resistance of the detection coil flows, so that the magnetostrictive film and the shaft are magnetized, which may make the detection signal unstable at an initial interval of torque detection. This may change a steering torque every time the ignition switch is turned on, which may give the driver an uncomfortable feeling in steering.

Further continuation of the application of the DC excitation voltage to the detection coil may cause disconnection of the detection coil due to an excessive current flowing therethrough or damage in a switching element in the switching circuit.

The present invention provides a magnetostrictive torque sensor capable of preventing an excessive current from flowing through the detection coil at least for a predetermined interval from power on.

First Embodiment

A magnetostrictive torque sensor according to a first embodiment detects a torque applied to a steering shaft of an electric power steering device (mentioned later).

Figure 1:
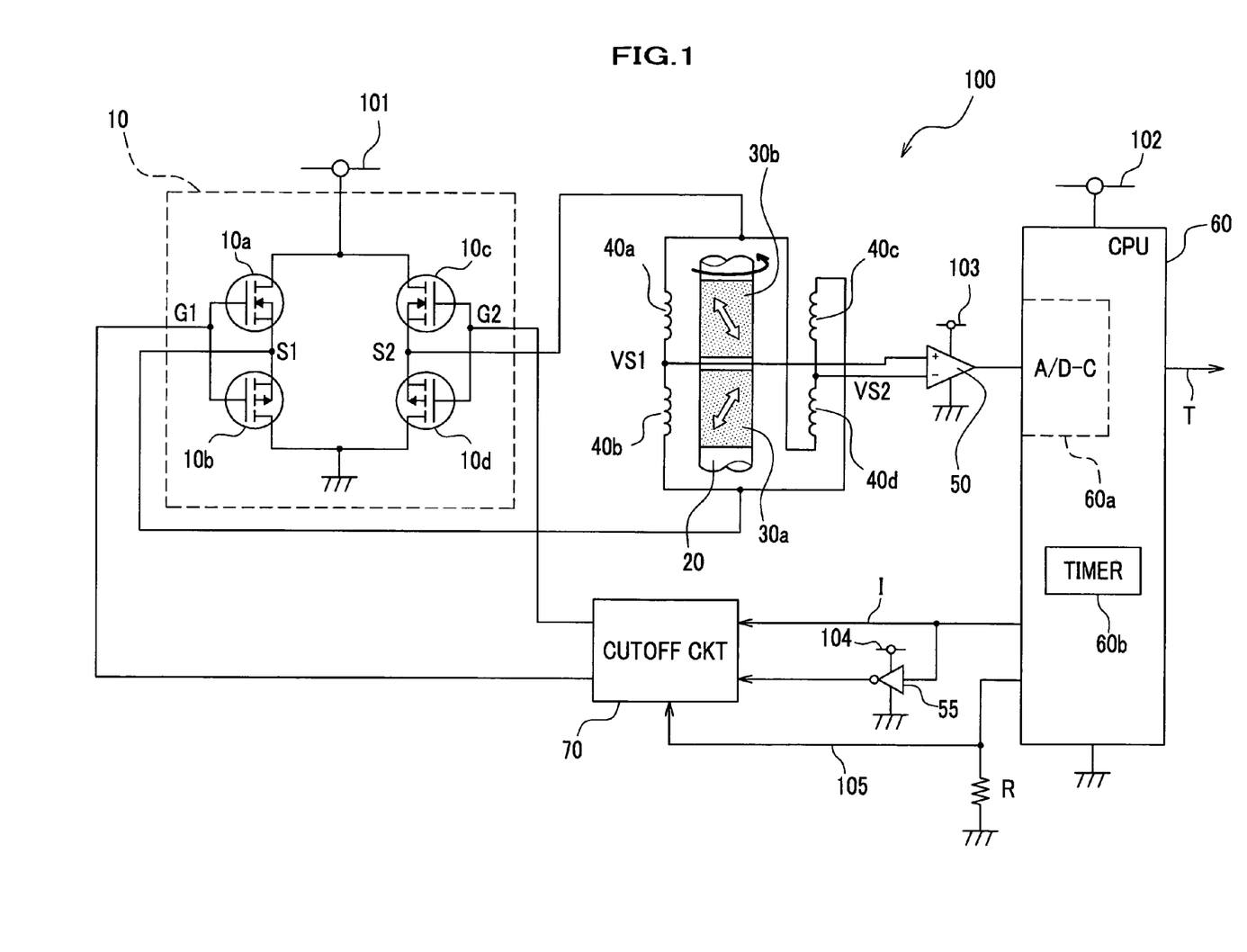
FIG. 1 is a block diagram of a magnetostrictive torque sensor according to a first embodiment of the present invention.

As shown in FIG. 1, the magnetostrictive torque sensor 100 includes a shaft 20 (steering shaft), magnetostrictive films (magnetic property change material, or first and second magnetostrictive films) 30a and 30b which are attached or coated around the two parts of the shaft 20 arranged in the axial direction which are close to each other, detection coils 40a and 40b which are connected in series and detection coils 40c and 40d which are connected in series in an opposite direction to the detection coils 40a and 40b, a bridge circuit 10 for applying an excitation voltage having a rectangular waveform to the detection coils 40a, 40b, 40c, and 40d, a differential amplifier 50 which calculates a differential voltage between a connection point VS1 between the detection coils 40a and 40b, and a connection point VS2 between the detection coils 40c and 40d, a cutoff circuit 70 for cutting off the excitation voltage supplied to the detection coils 40a, 40b, 40c, and 40d from the bridge circuit 10, and a CPU (Central Processing Unit) 60 which controls the cutoff circuit 70 and processes an output from the differential amplifier 50 to operate an torque intensity applied to the shaft 20 and the direction of the torque.

The bridge circuit 10 includes four switching elements 10a, 10b, 10c, and 10d. The switching elements 10a and 10c are P-channel MOSFETs. The switching elements 10b and 10d are N-channel MOSFETs. Drains of the switching elements 10a and 10c are connected to a detection coil supply voltage 101, and sources of the switching elements 10b and 10d are grounded. Further, both a source of the switching elements 10a and a drain of the switching element 10b are connected to a terminal S1. Both a source of the switching element 10c and a drain of the switching element 10d are connected to a terminal S2. In addition gates of the switching elements 10a and 10b are connected to a gate terminal G1, and gates of the switching elements 10c and 10d are connected to a gate terminal G2.

The bridge circuit 10 forms an inverter circuit in which setting the terminal G1 to a ground potential makes the terminal S1 identical with the potential of the detecting coil supply voltage 101 and setting the gate terminal G1 to the potential of the detection coil power supply makes the terminal S1 identical with a ground potential. Similarly, in the bridge circuit 10, setting the terminal G2 to the ground potential makes the terminal S2 identical with the potential of the detecting coil supply voltage 101, and setting the gate terminal G2 to the potential of the detection coil power supply voltage 101 makes the terminal S2 identical with the ground potential.

The magnetostrictive films 30a and 30b are films of the magnetic property change material which are magnetically anisotropic such as Fe—Ni system and the Fe—Cr system, for instance. Moreover, the magnetostrictive films 30a and 30b are respectively attached on two parts of the shaft 20 arranged in the axial direction which are close to each other so as to be anisotropic in opposite directions. Therefore, a difference in magnetic permeability (change in a magnetic property) between the magnetostrictive films 30a and 30b is generated when the torque is applied to the shaft 20 in one direction, and the difference in the magnetic permeability appears in the opposite direction when the torque is applied in the opposite direction.

Here, a method of forming the magnetostrictive films 30a and 30b and a method of making the magnetostrictive films 30a and 30b anisotropic are described. First, the shaft 20 is heat-treated so that Rockwell hardness becomes HRC40-65. Then, the magnetostrictive films 30a and 30b, both of which are plated or deposited in an axial direction on vertically separated two parts of an outer peripheral surface of the shaft 20. Next, twisting the shaft 20 provides a counterclockwise torque T (approximately 10 kgf·m (98N·m), for instance) to the magnetostrictive film 30a. In this state, a coil is used to vibrate the magnetostrictive film 30a at a high frequency. Then, the magnetostrictive film 30a is heated at approximately 300° C. for a several seconds and then cooled. After that, the torque T in the counterclockwise direction is removed from the magnetostrictive film 30a. Consequently, the magnetostrictive film 30a becomes anisotropic. Next, the shaft 20 is twisted in the opposite direction so as to apply a clockwise torque (approximately 10 kgf·m (98N·m), for instance) to the magnetostrictive film 30b. In this state, a coil is used to vibrate the magnetostrictive film 30b at a high frequency similarly to the magnetostrictive film 30a. Thus, the magnetostrictive film 30b is heated at approximately 300°

C. As a result, the magnetostrictive film 30b becomes anisotropic in the opposite direction to the magnetostrictive film 30a.

The series circuit which includes the detection coils 40a and 40b and the series circuit which includes the detection coils 40c and 40d each detect the difference between the magnetic permeabilities of the magnetostrictive films 30a and 30b as an inductance difference. When the excitation voltage is applied to the both ends of the series circuits, the difference in the magnetic permeabilities between the magnetostrictive films 30a and 30b is detected as change in a potential difference between the connection points VS1 and VS2. In other words, the torque corresponds to differences between the potential at the connection point VS1 and an intermediate potential which is a potential before the torque changes and between the potential at the connection point VS2 and the intermediate potential. The potentials at the connection points VS1 between the detection coils 40a and 40b and VS2 between the detection coils 40c and 40d vary in opposite directions (polarities). Thus, as compared to a case of detecting change in an only potential at either connection point, the detection sensitivity is doubled. In addition, the detection coils 40a to 40d are connected in series, and a voltage difference signal is obtained from two potential signals thereof, so that variations due to a temperature change can be cancelled each other.

The differential amplifier 50, using an operational amplifier, amplifies the potential difference between the connection points VS1 and VS2. The CPU 60 serves as a controller and includes an A/D (analog to digital) converter 60a to convert an analog voltage output from the differential amplifier 50 into a digital signal for signal processing. In addition, the CPU 60 calculates the intensity and direction of the torque applied to the shaft 20 to generate the torque signal T. Moreover, the CPU 60 generates the excitation signal I which is a rectangular wave signal. The excitation signal I is supplied to the gate terminal G2 of the bridge circuit 10 through the cutoff circuit 70, and applied to the gate terminal G1 through an inverter 55 supplied with a gate IC supply voltage 104 and the cutoff circuit 70. In addition, the excitation signal I is set to be a low level to inhibit generation of the excitation voltage having the rectangular waveform for a predetermined interval (signal startup interval) from when the CPU supply voltage 102 is applied (power on). Thus, the inverted signal of the excitation signal I is set to a high level for the signal startup interval. The CPU 60, including a timer 60b, generates a power-on permission signal 105 for informing the cutoff circuit 70 that transmission of the excitation signal I is allowed because the predetermined interval measured by the timer 60b elapses. Further, a transmission line for transmitting the power-on permission signal 105 is pulled down with a resistor R. The differential amplifier 50 is powered by an OP Amp supply voltage 103, and the CPU 60 is powered by a CPU supply voltage 102. Both voltages of the power supplies are 5V.

The cutoff circuit 70 according to the embodiment stops transmitting the excitation signal I and its inverted signal to the gate terminals G1 and G2 of the bridge circuit 10 for the predetermined interval and permits the transmission of the excitation signal I and the inverted signal when receiving the power-on permission signal 105. More specifically, the cutoff circuit 70 sets the gate terminals G1 and G2 to be the same potential, i.e., the ground potential or the detection coil supply voltage 101, to prevent currents from flowing through the detection coils 40a, 40b, 40c, and 40d. The cutoff circuit 70 stops application of the excitation voltage to the detection coils 40a, 40b, 40c, and 40d for the predetermined interval after the startup of the CPU supply voltage 102. More specifically, both the excitation signal I and the inverted signal to be supplied to the bridge 10 are cut off.

An operation of the magnetostrictive torque sensor 100 will be described. The magnetostrictive torque sensors 100 equipped in the electric power steering device 200 (see FIG. 8) start up when the ignition switch IG-SW is turned on.

Figure 2A:
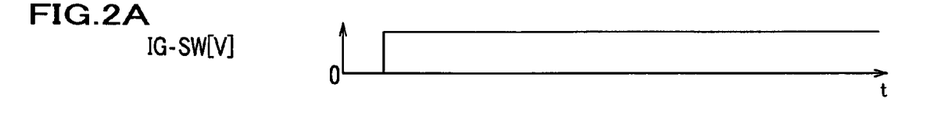
FIGS. 2A to 2I are charts for explaining the signals in the magnetostrictive torque sensor according to the first embodiment.
Figure 2B:
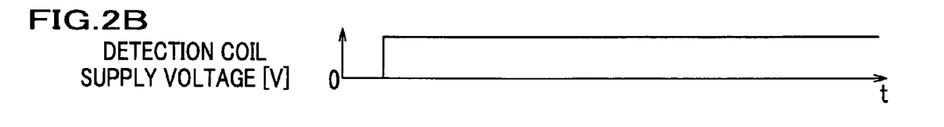
Figure 2C:
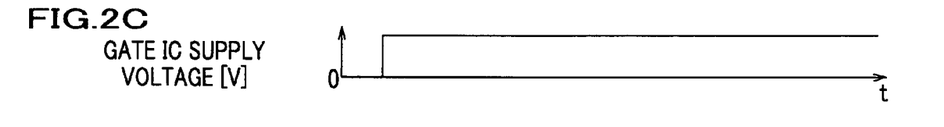
Figure 2D:
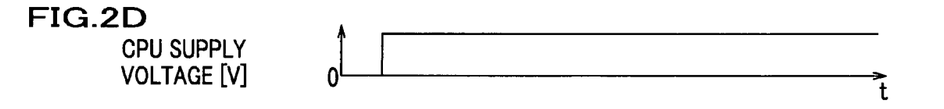

FIG. 2A shows a time variation of the output voltage of the ignition switch IG-SW. FIG. 2B shows a time variation of the detection coil supply voltage 101. FIG. 2C shows a time variation of the gate IC supply voltage 104. FIG. 2D shows a time variation of the CPU supply voltage 102. In response to turning on of the ignition switch IG-SW, respective power supplies rise as shown in FIGS. 2A to 2D.

Figure 2E:
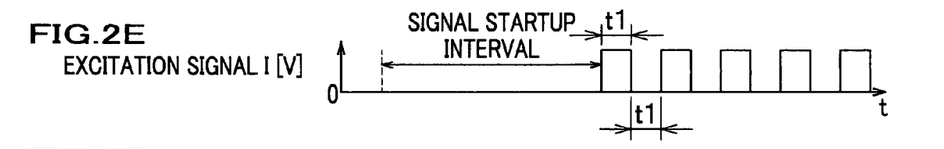
Figure 2F:
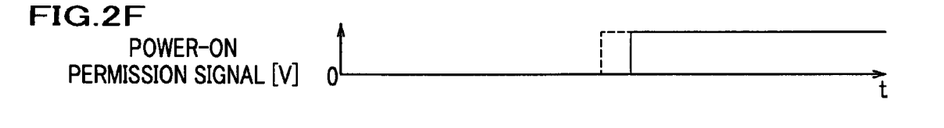

FIG. 2E shows a waveform of the excitation signal I in which a rectangular wave voltage having a pulse width t1 and a duty of ½ is generated after the signal startup interval elapses from when the ignition switch IG-SW is turned on. The rectangular wave voltage is applied to the gate terminal G2 of the bridge circuit 10 and the inverted voltage is applied to the gate terminal G1 through the cutoff circuit 70. FIG. 2F shows a waveform of the power-on permission signal 105 with a solid line of which level goes to a high level from a low level by the CPU 60 when the transmission of the excitation signal is allowed in response to the timer 60b. When receiving the power-on permission signal 105, the cutoff circuit 70 permits transmission of the excitation signal I and the inverted signal to the gate terminals G1 and G2.

Figure 2G:
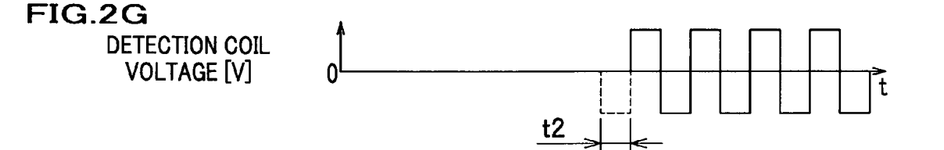

FIG. 2G shows a waveform of a detection coil voltage, i.e., the excitation voltage applied to the detection coils 40a, 40b, 40c, and 40d. When the excitation signal I having a high level is applied to the gate terminal G2 of the bridge circuit 10, and its inverted signal having a low level is applied to the gate terminal G1, the terminal S2 becomes the ground potential, and the terminal S1 becomes the detection coil supply voltage 101. On the other hand, when the excitation signal I having a low level is applied to the gate terminal G2 of the bridge circuit 10, and its inverted signal having a high level is applied to the gate terminal G1, the terminal S1 becomes the ground potential, and the terminal S2 becomes the detection coil supply voltage 101. Thus, the series circuit including the detection coils 40a and 40b and the series circuit including the detection coils 40c and 40d are supplied with an AC voltage having a rectangular waveform in which the voltage alternates between positive and negative voltages.

Figure 2H:
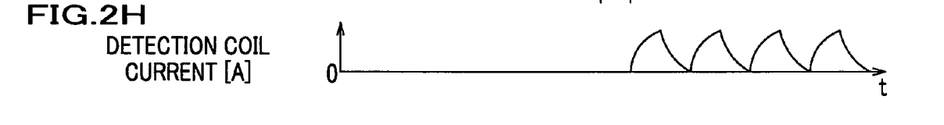

FIG. 2H shows a waveform of the detection coil current. When a positive voltage is applied to the detection coils 40a, 40b, 40c, and 40d, a current flows which increases monotonically in time base with a proportional coefficient which is an inverse number of the inductance. When a negative voltage is applied to the detection coils 40a, 40b, 40c and 40d, a current, decreasing monotonically in time base, flows therethrough. In this operation, the increasing current and the decreasing current are limited by the pulse widths t1, so that no saturated current flows therethrough. Permeability defining the inductance has a non-linearity, so that the currents do not change linearly.

Figure 2I:
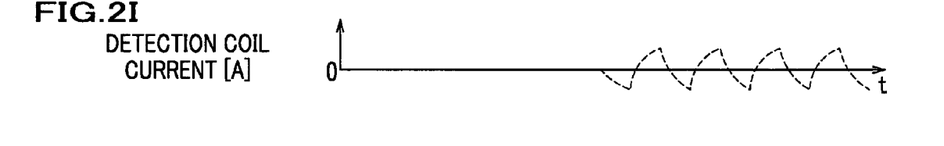

As shown by the broken line in FIG. 2F, when the power-on permission signal 105 is shifted in timing, as shown by a broken line, a negative voltage pulse (shown by a broken line) having a duration t2 is applied as shown in FIG. 2G, so that a decreasing current flows only for the interval t2. Next, when a positive voltage pulse having a pulse width t0 is applied, the current increases from the negative current intensity in time base, and when the negative voltage pulse is applied, the current stops increasing and decreases again. More specifically, increasing the duration t2 decreases an average current intensity as shown in FIGS. 2H and 2I, and thus approximately equalizing the duration t2 to the duration t1 provides an AC current flowing through the detection coils 40a, 40b, 40c, and 40d as shown in FIG. 2I. In other words, appropriately setting the current flowing through the detection coils 40a, 40b, 40c, and 40d at timing of a rising or falling edge of the excitation signal I makes the current an AC current.

Figure 3A:
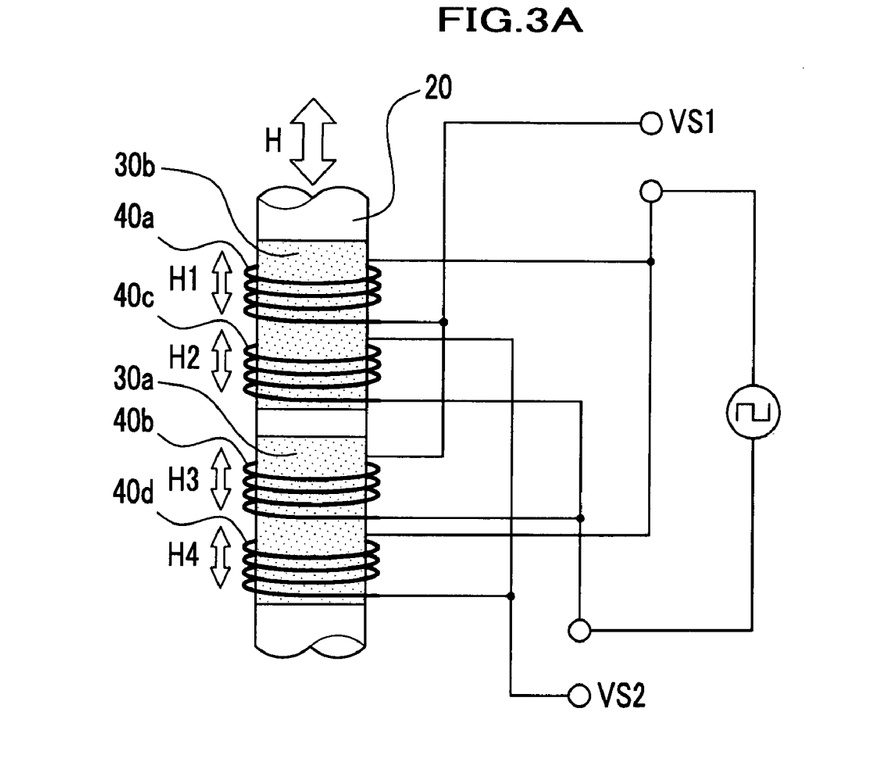
FIG. 3A shows an illustration for explaining operation of the magnetostrictive torque sensor according to the first embodiment when an AC voltage having a rectangular waveform is applied.

FIG. 3A shows the detection coils 40a, 40b, 40c, and 40d arranged around the shaft 20. The shaft 20 is loosely fitted in the detection coils 40a and 40c to be arranged around a surface of the magnetostrictive film 30b coated on the shaft 20 at two locations in the axial direction of the shaft 20. Further the shaft 20 is loosely fitted in the detection coils 40b and 40d to be arranged around a surface of the magnetostrictive film 30a coated on the shaft 20 at two locations in the axial direction of the shaft 20. The coils 40a, 40b, 40c, and 40d are wound in the same direction not to cancel magnetic fields H1, H2, H3, and H4. The excitation voltage having the rectangular wave voltage is applied between the detection coils 40a and 40d and between the detection coils 40b and 40c. The connection point between the detection coils 40a and 40b has a lead as the connection point VS1. The connection point between the detection coils 40c and 40d has a lead as the connection point VS2.

Figure 3B:
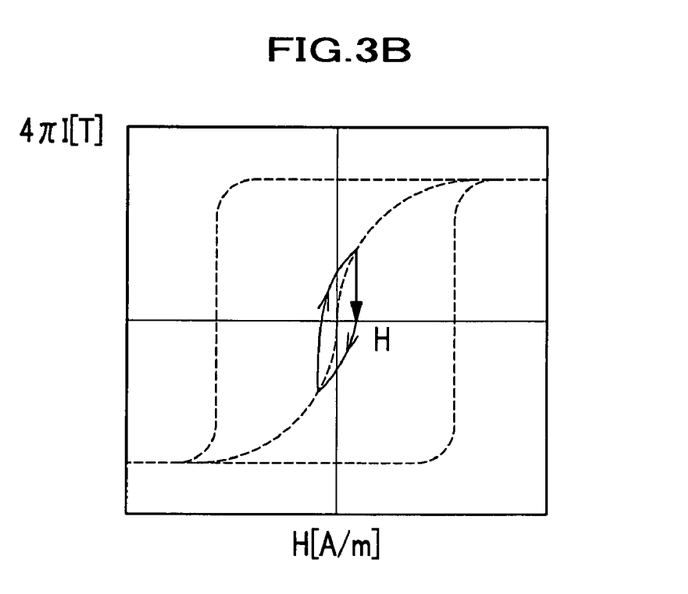
FIG. 3B is a chart for explaining the operation of the magnetostrictive torque sensor shown in FIG. 3A.

FIG. 3B shows a relationship between a magnetic field intensity H [A/m] and a magnetic flux density (magnetizing force) B=4πI[T] when the alternative current flows therethrough. Appropriately setting the pulse duration t1 of the excitation signal I prevents the magnetic flux H from being saturated. Further, making the alternating current symmetrical between negative and positive waveform parts results in a half of the magnetic flux density in absolute value that would be generated by only a positive or negative pulse current. In addition, this setting keeps linearity in a relation between the current and the magnetic flux density (magnetizing force).

As mentioned above, according to the first embodiment, the cutoff circuit 70 prevents either or both of the excitation signal I and its inverted signal from being applied to the gate terminals G1 and G2. This prevents a DC voltage caused by a DC current signal generated for the signal startup interval from being applied to the detection coils 40a, 40b, 40c, and 40d without a saturation current depending on internal resistances flowing through the detection coils 40a, 40b, 40c, and 40d. Thus, the magnetostrictive films 30a and 30b do not saturate for the signal startup interval. Further, varying the duration t2 which is a difference between the termination of the signal startup interval and the cut-off termination time of the cutoff circuit 70 can change the average current, which makes the current flowing through the detection coils 40a, 40b, 40c, and 40d an alternating current.

In other words, an offset of the current flowing through the detection coils 40a, 40b, 40c, and 40d can be adjusted by changing duration t2 of at least one of pulses having the opposite polarity of the offset included in the excitation voltage having square waveform (symmetric waveform). More specifically, the excitation voltage includes pulses symmetric regarding time base and negative and positive polarities, and the duration t2 of at least one of pulses is controlled to adjust an offset of the current flowing through the detection coils 40a, 40b, 40c, and 40d.

This is provided by using the timer 60b. For example, the CPU 60 sets the timer 60b for the signal start up interval shown in FIG. 2E. When the signal startup interval elapses, the CPU 60 sets and starts the timer 60b to measure the duration t2. When the duration t2 elapses, the CPU 60 sets the timer 60b for the duration t1 and repeats this.

Then, the average current can be precisely adjusted to decrease the offset to make the detection coil current an AC current.

Second Embodiment

In the first embodiment, the excitation signal I and its inverted signal are cut off to prevent the DC voltage generated for the signal startup interval from being applied to the gate terminal G1 with the cutoff circuit 70. On the other hand, in a second embodiment, a signal corresponding to the signal startup interval is generated with a differential circuit 80 and a gate IC to shut off the inverted signal of the excitation signal.

Figure 4:
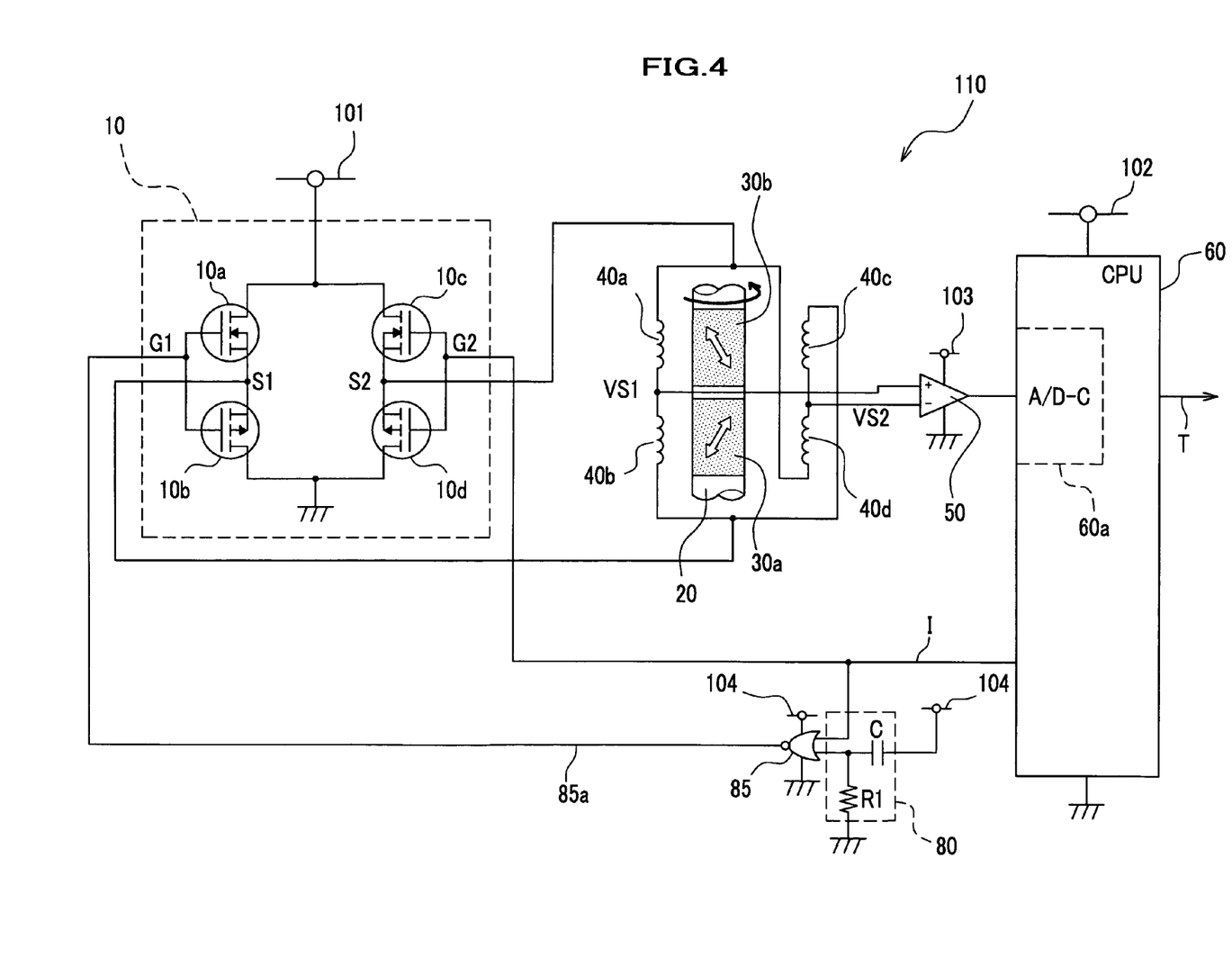
FIG. 4 is a block diagram of a magnetostrictive torque sensor according to a second embodiment of the present invention.

FIG. 4 is a circuit diagram of a magnetostrictive torque sensor 110 according to a second embodiment.

In FIG. 4, will be described only different points because the bridge circuit 10, the shaft 20, the magnetostrictive films 30a and 30b, the detection coils 40a, 40b, 40c, and 40d, the differential amplifier 50, and the CPU 60 are the same as those described in the first embodiment.

The excitation signal I generated by the CPU 60 is directly applied to the gate terminal G2 for driving the FETs 10c and 10d located on the right part of the bridge circuit 10. The differential circuit 80 including a capacitor C and a resistor R1 generates a differential output at rising of a gate IC supply power 104. The gate IC 85 have a NOR operation between the differential output and the excitation signal I. A resultant NOR signal is applied to a gate terminal G1 as a left FET drive signal for the FETs on the left of the bridge circuit 10.

Figure 5A:
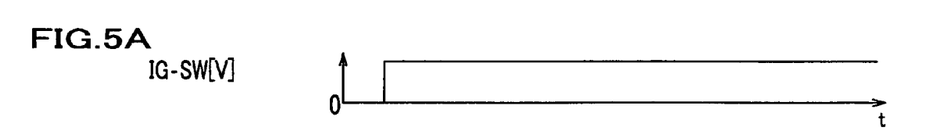
FIGS. 5A to 5J are charts for explaining signals in the magnetostrictive torque sensor according to the second embodiment.
Figure 5B:
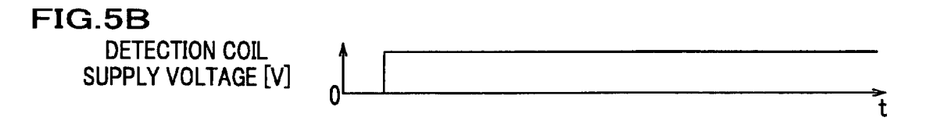
Figure 5C:
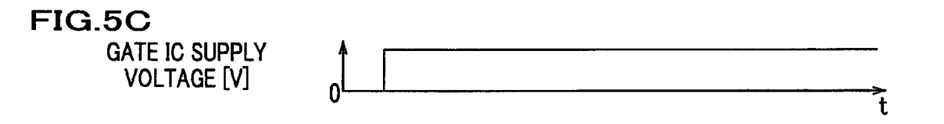
Figure 5D:
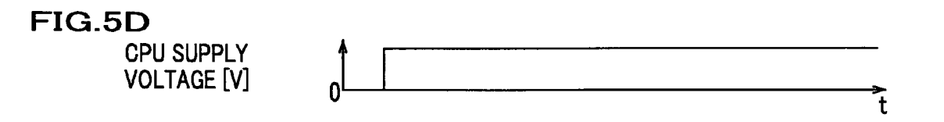
Figure 5E:
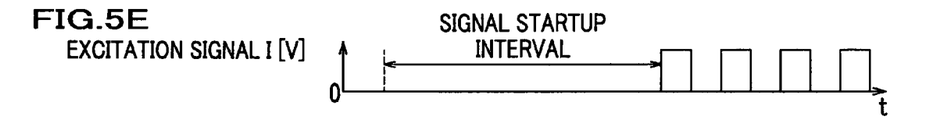
Figure 5F:
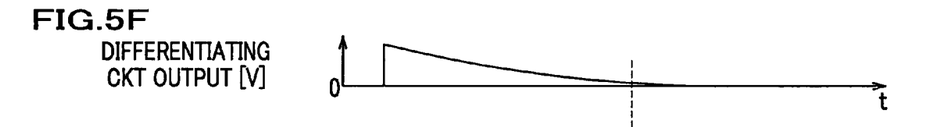
Figure 5G:
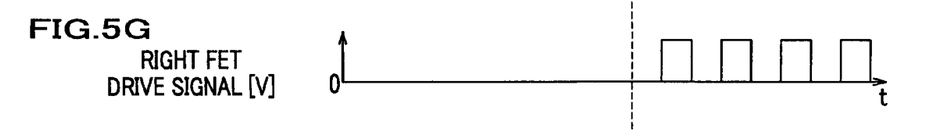
Figure 5H:
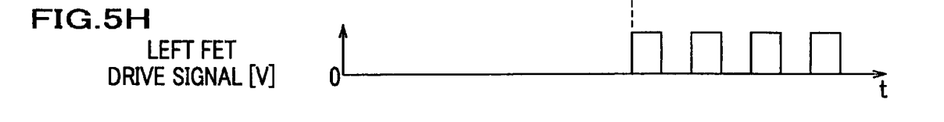
Figure 5I:
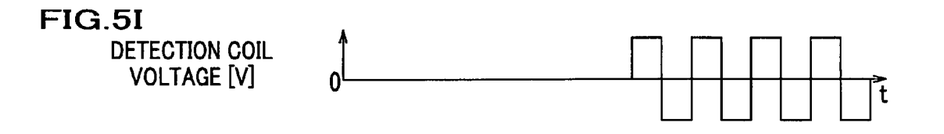
Figure 5J:
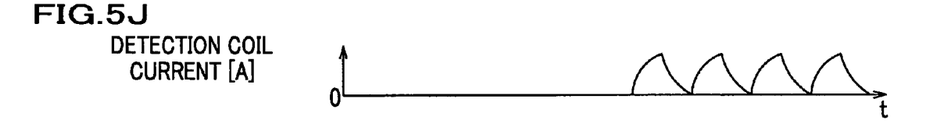

FIGS. 5A to 5J show waveforms at respective points in the circuit shown in FIG. 4. The waveforms shown in FIGS. 5A to 5E are the same as those shown in FIG. 2A to 2E, and thus a duplicated description is omitted. FIG. 5F shows a waveform of the differential circuit 80 which generates a voltage substantially identical with the gate IC supply voltage 104 at the same time as a rising edge of the gate IC power supply shown in FIG. 5C, and then the voltage decreases in accordance with a time constant determined by the capacitance of the capacitor C and a resistance of the resistor R1. FIG. 5G shows a waveform of a right FET drive signal for the FETs on the right (in FIG. 4) of the bridge circuit 10, the waveform corresponding to that shown in FIG. 5E. FIG. 5H shows a waveform of a left FET drive signal 85a which is an inverted signal of the excitation signal I and which is not generated when an output voltage of the differentiating circuit 80 is greater than a threshold voltage of the NOR gate IC 85. The time constant of the differentiating circuit 80 is determined in accordance with the signal startup interval. FIG. 5I shows a waveform of a detection coil voltage, and FIG. 5J shows a waveform of the detection coil current, which are the same as those in the first embodiment. However, a rising edge of the left FET drive signal may change depending on a relation between the output of the differentiating circuit and the threshold voltage of the gate IC 85.

Third Embodiment

In the first and second embodiments, the rectangular wave signals applied to the gate terminals G1 and G2 of the bridge circuit 10 are controlled. However, controlling a supply voltage applied to the bridge circuit 10 can prevent the detection coils 40a, 40b, 40c, and 40d from being supplied with the DC voltage.

Figure 6:
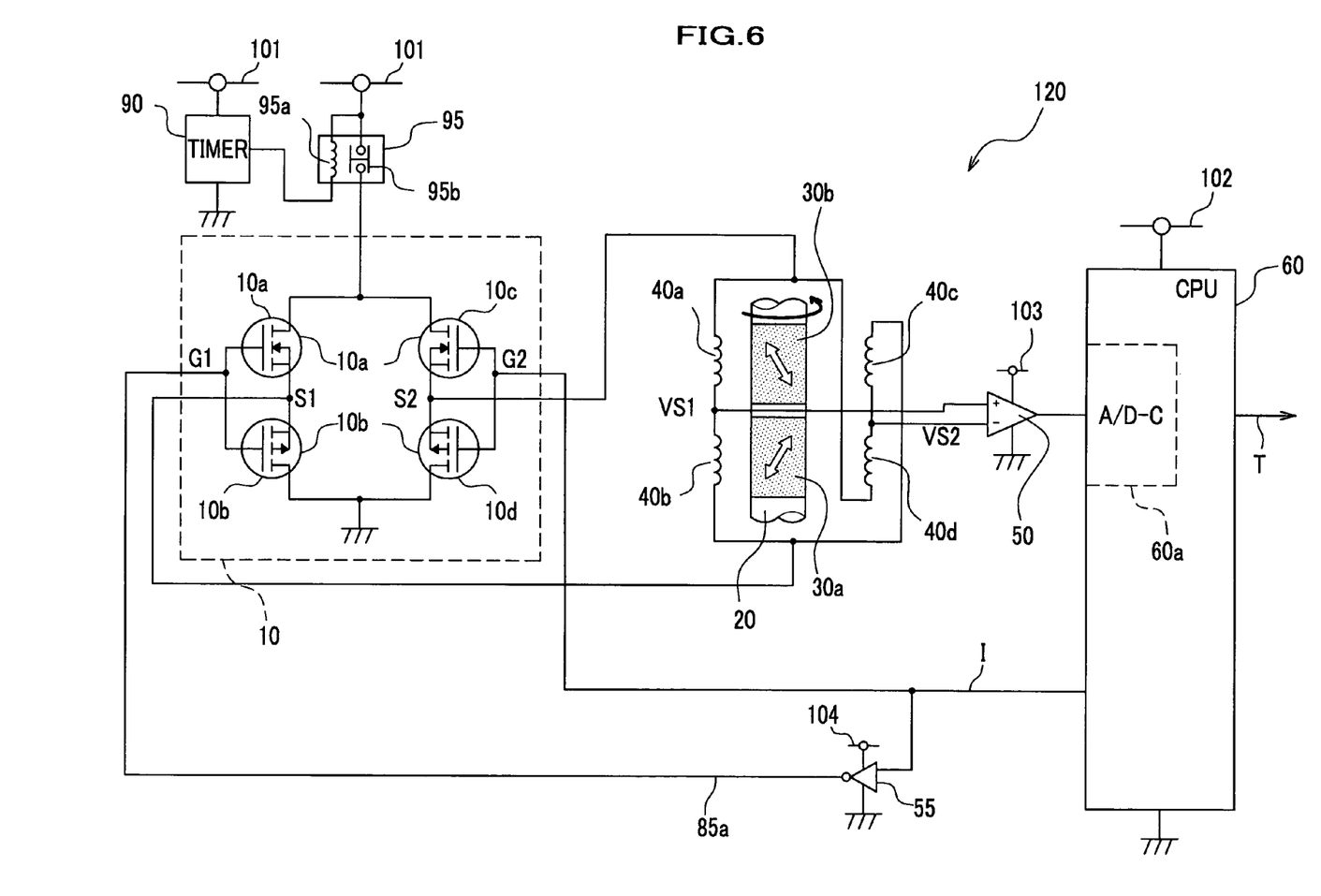
FIG. 6 is a block diagram of a magnetostrictive torque sensor according to a third embodiment of the present invention.

FIG. 6 shows a circuit diagram of a magnetostrictive torque sensor 120. In FIG. 6, the bridge circuit 10, the shaft 20, the magnetostrictive films 30a and 30b, the detection coils 40a, 40b, 40c, and 40d, and the differential amplifier 50, the inverter 55, and the CPU 60 are the same as those described in the first embodiment, and thus a duplicated description will be omitted.

A relay 95 as a cutoff circuit includes a relay coil 95a and a contact 95b therein in which turning on the relay coil 95a supplies the detection coil supply voltage 101 to the switching elements 10a and 10c of the bridge circuit 10. A timer 90 turns on the relay coil 95a after a predetermined interval elapses from a startup of the detection coil supply voltage 101. The predetermined interval of the timer corresponds to the signal startup interval.

With reference to FIGS. 7A to 7J will be described an operation of the third embodiment.

Figures 7, 7A:
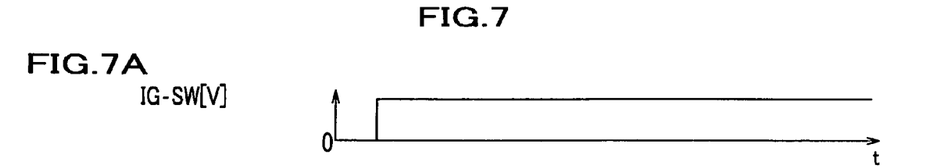
FIGS. 7A to 7J are charts for explaining signals in the magnetostrictive torque sensor according to the third embodiment.
Figure 7B:
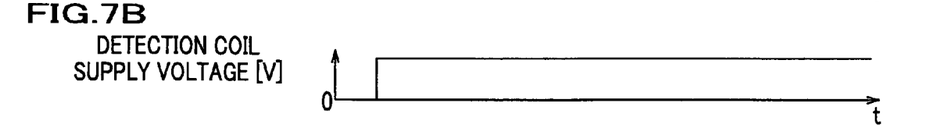
Figure 7C:
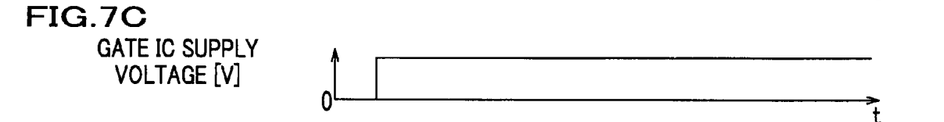
Figure 7D:
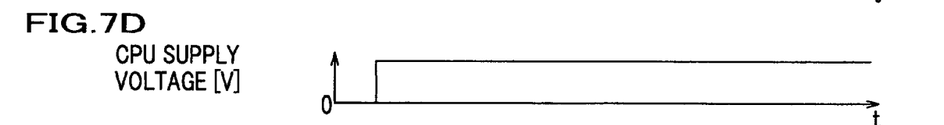
Figure 7E:
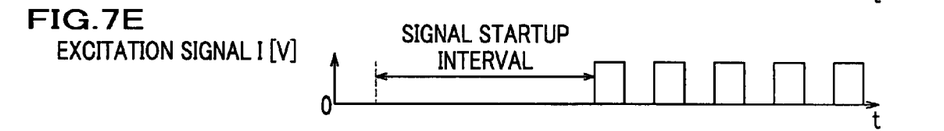
Figure 7F:
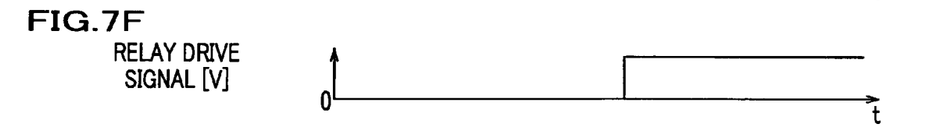
Figure 7G:
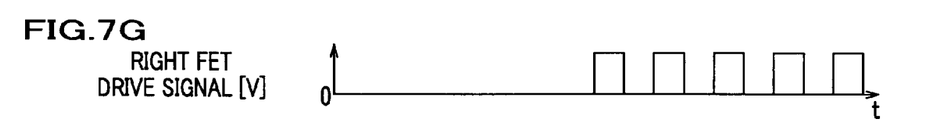
Figure 7H:
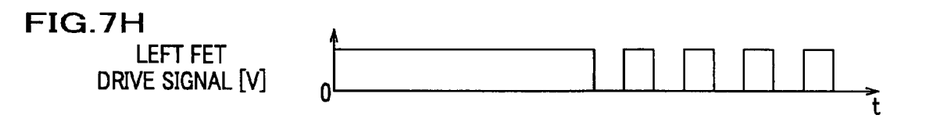
Figures 7I, 7J:
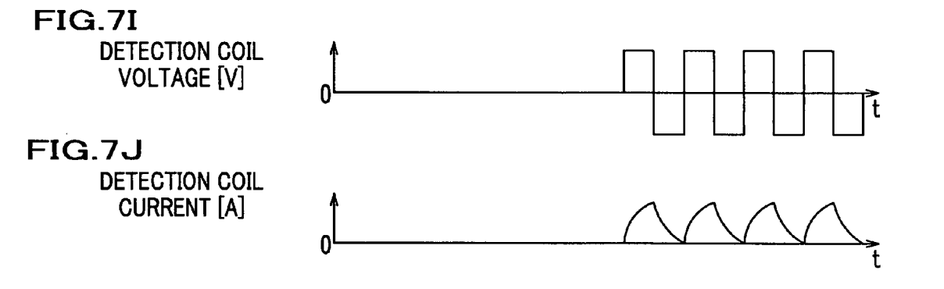

The waveforms shown in FIGS. 7A to 7E are the same as those described in the first embodiment, and thus a duplicated description will be omitted. FIG. 7F shows a waveform of the relay drive signal which is generated by the timer 90. The relay drive signal is delayed from turning-on of the ignition switch (IG-SW) shown in FIG. 7A by the startup interval in the excitation signal I shown in FIG. 7E. The right FET drive signal shown in FIG. 7G has a waveform which is the same as the excitation signal I, and the left FET drive signal shown in FIG. 7H has a waveform which is an inverted waveform of the excitation signal I. FIG. 7I shows a waveform of the detection coil voltage in which a rectangular wave AC voltage same as that in the first embodiment is applied to the detection coils 40a, 40b, 40c, and 40d after the signal startup interval elapses. FIG. 7J shows the detection current which is the same as that described in the first embodiment. More specifically, the structure according to the third embodiment prevents the detection coils 40a, 40b, 40c, and 40d from being supplied with a DC voltage using the left FET drive signal generated at the signal startup interval.

[Application]

Figure 8:
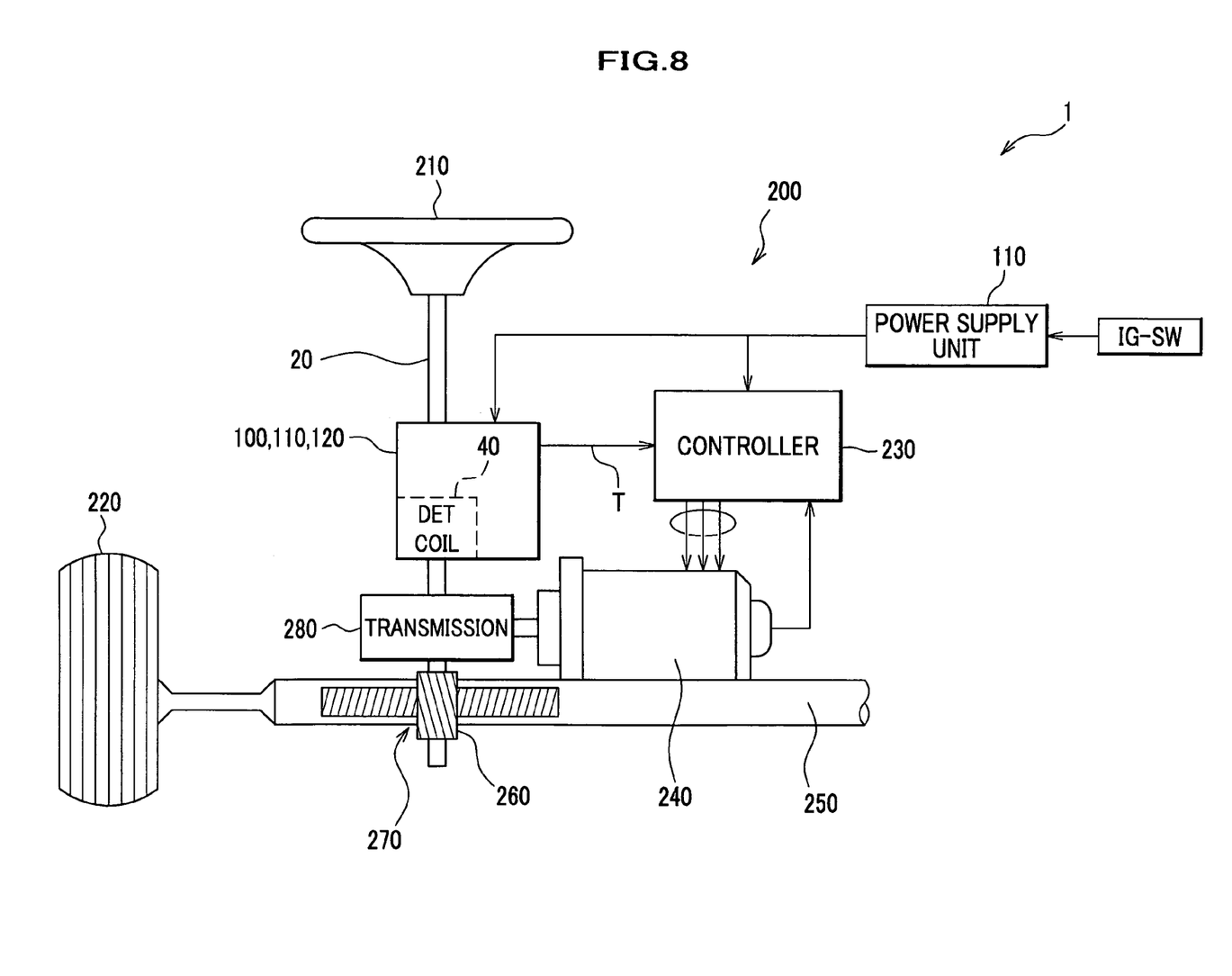
FIG. 8 is a block diagram of an electric power steering device using any of the magnetostrictive torque sensors according to the first to third embodiments of the present invention.

With reference to FIG. 8 will be described an electric power steering device using the magnetostrictive sensors 100, 110, and 120 according to the first to third embodiments.

In an electric power steering device 200 installed in a vehicle 1, rotating a steering wheel 210 rotates the shaft 20 as a steering shaft connected to the steering wheel 210, which rotates a pinion 260 forming a rack and pinion mechanism 270, shifting a rack shaft 250 to change a direction of the steerable wheel 220. In this operation, the controller 230 controls driving a motor 240 in accordance with the torque signal T detected by any of the magnetostrictive torque sensors 100, 110, and 120 using the detection coils 40a, 40b, 40c, and 40d. The motor 240 rotates the pinion 260 through a transmission 280 so as to reduce a steering torque to be applied to the steering wheel 210.

Each of the magnetostrictive sensors 100, 110, and 120 is supplied with the detection coil supply voltages 101, the CPU supply voltage 102, the operational amplifier supply voltage 103, and the gate IC supply voltage 104 from power supplies included in a power supply unit 110 in response to the ignition switch IG-SW. The power supply unit 110 further supply power for the controller 230.

Assuming that a steering torque generated by a driver is TH, a torque transmitted to the pinion 260 is TP, and a coefficient relating to an intensity of an assistant torque generated by the motor 240 is KA, the following relation is established.

$$TH=TP/(1+KA)$$

Further, as the electric power steering device 200 is usable a steer by wire in which the steering wheel 210 and the steerable wheels 220 are mechanically disconnected.

According to this application, during the signal startup interval upon turning-on of the ignition switch IG-SW, the bridge circuit 10 does not operate, which prevents the detection signal from being unstable at a start of detecting the torque without unnecessary magnetization of the magnetostrictive films 30a and 30b and the shaft 20. This structure eliminates a change in the steering torque and deterioration in feeling of the driver in steering the steering wheel 210

COMPARATIVE EXAMPLE

Figure 9:
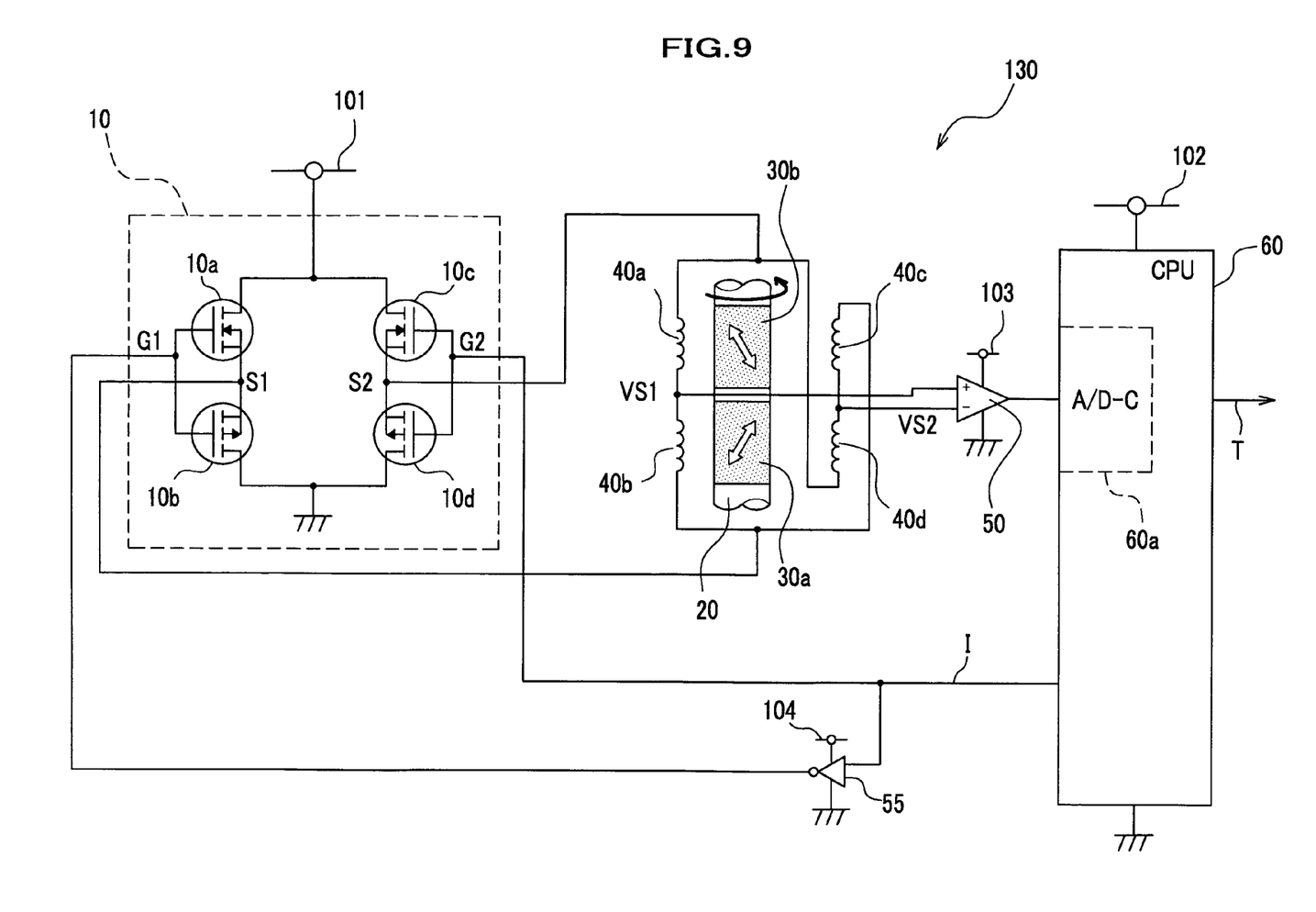
FIG. 9 is a block diagram of a comparative example of a magnetostrictive torque sensor provided by a simulation by the inventor for comparing the first to third embodiments with this example.

The inventor provided a simulation with a comparative example structure shown in FIG. 9.

In FIG. 9, the bridge circuit 10, the shaft 20, the magnetostrictive films 30a and 30b, and the detection coils 40a, 40b, 40c, and 40d, the differential amplifier 50, the inverter 55, and the CPU 60 are the same as those described in the first to the third embodiments, and a duplicated description will be omitted. In the comparative example, the excitation signal I and the inverted signal are directly applied to the gate terminals G1 and G2, the detection coil supply voltage 101 is directly applied to the drains of the switching elements 10a and 10c.

With reference to FIG. 10A to 10I, will be described an operation of the comparative example.

Figures 10, 10A:
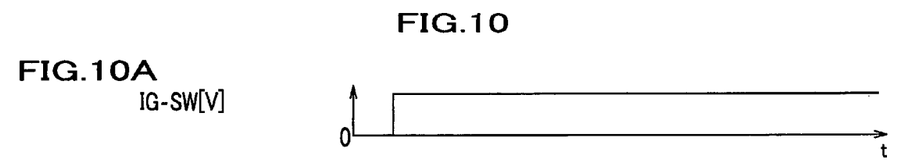
FIGS. 10A to 10I are charts for explaining signals of the comparative example shown in FIG. 9.
Figure 10B:
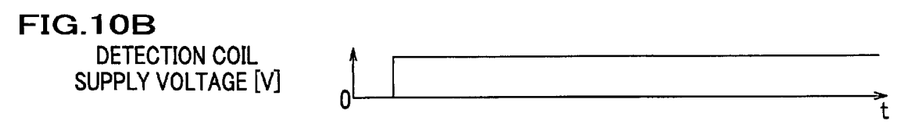
Figure 10C:
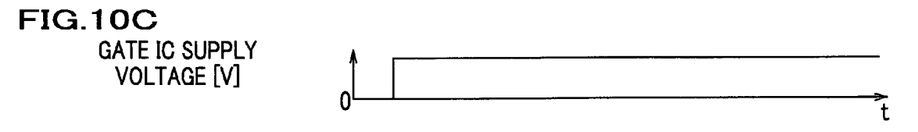
Figure 10D:
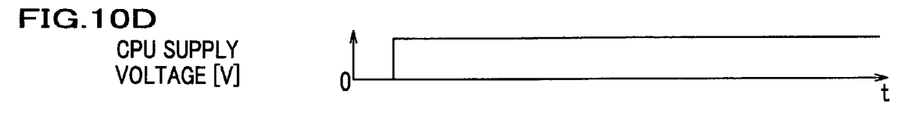
Figure 10E:
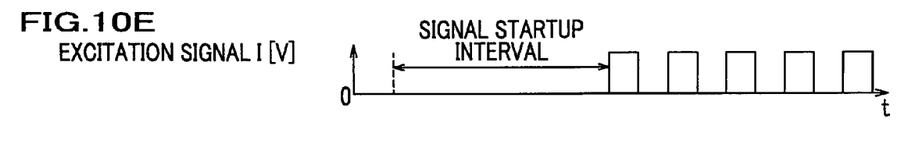
Figure 10F:
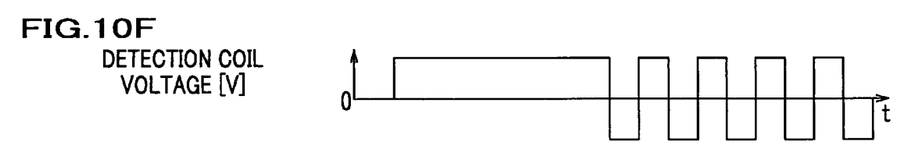
Figure 10G:
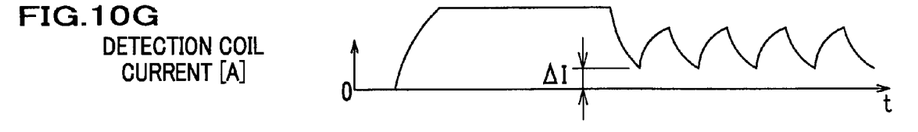
Figure 10H:
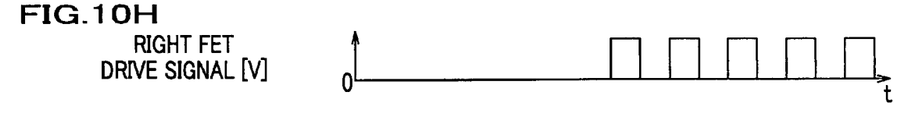
Figure 10I:
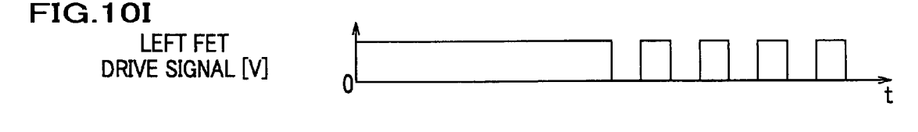

Waveforms shown in FIGS. 10A to 10D are the same as those shown in the first to the third embodiments, and thus, a duplicated description will be omitted. The excitation signal shown in FIG. 10E is a rectangular wave signal having a duty of ½ generated by the CPU 60 after the signal startup interval elapses. The excitation signal I and an inverted signal thereof are applied to the gate terminals G1 and G2, so that the detection coil voltage having a waveform of shown in FIG. 10F is generated. The waveform shows an AC rectangular wave voltage similar to the first to third embodiments at a part other than the signal startup interval, but during the signal startup interval a DC voltage is applied to the detection coil 40a, 40b, 40c, and 40d. Accordingly, the detection coil current becomes a waveform as shown in FIG. 10G. The detection coil current increases at a rising edge of the detection coil supply voltage 101, gradually increasing, and becomes a saturated current determined by an internal resistance of the detection coil. When a polarity of the detection coil voltage is inverted, the current begins decreasing. A decrease in the current is determined by the pulse duration t1 of the excitation signal. After that, when the polarity of the detection coil voltage turns positive, the current in the detection coil increases again. Thus, the average current flowing through the detection coils 40a, 40b, 40c, and 40d has an offset ΔI which magnetizes the magnetostrictive films 30a and 30b. FIG. 10H shows a waveform of the right FET drive signal and FIG. 10I shows the left FET drive signal.

Figure 11A:
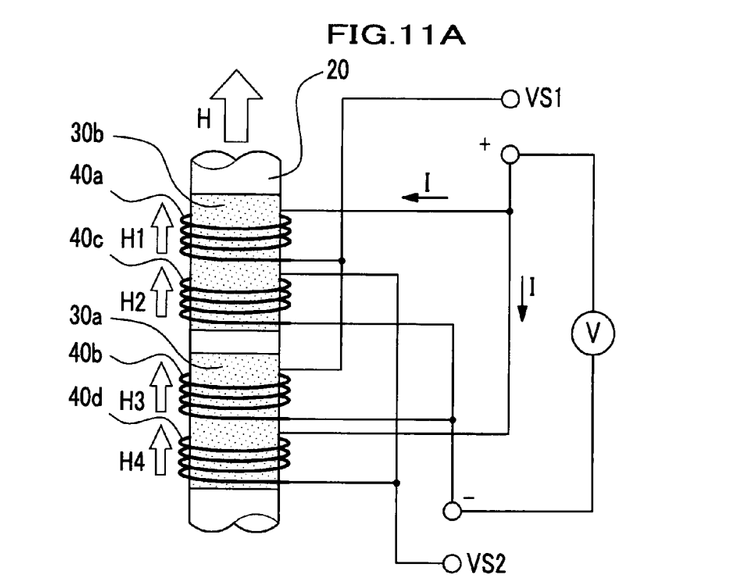
FIG. 11A shows an illustration for explaining operation of the comparative example of the magnetostrictive torque sensor when a DC voltage is applied to the detection coils.
Figure 11B:
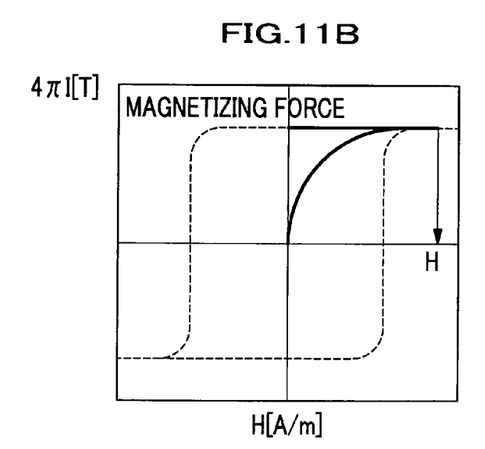
FIG. 11B is a chart for illustrating a relation between a magnetic field intensity and a magnetizing force in the comparative example of the magnetostrictive torque sensor.
Figure 11C:
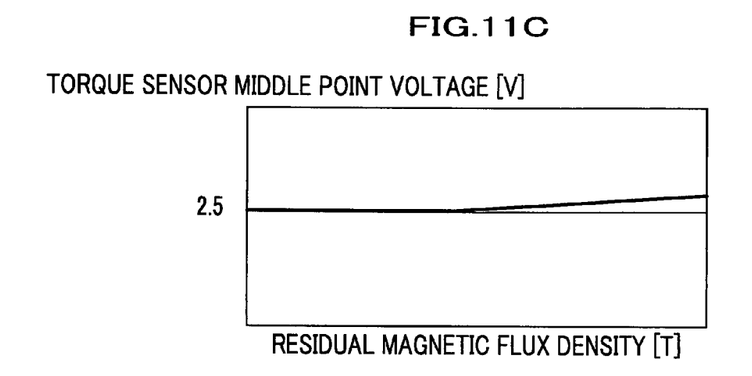
FIG. 11C is a chart for illustrating a relation between a middle point voltage and a residual magnetic flux density of the comparative example.

With reference to FIGS. 11A to 11C, will be described magnetization of the magnetostrictive films 30a and 30b in the comparative example. FIG. 11A shows a status in which a DC voltage V is applied to the detection coils 40a, 40b, 40c, and 40d and a resulting DC current I flows therethrough, which is different from the status shown in FIG. 3A in that the magnetostrictive films 30a and 30b are magnetized in one direction. FIG. 11B shows a status in which a saturated DC current flows, so that a magnetizing force 4πI is saturated. FIG. 11C shows a relation between a torque sensor middle point voltage and a residual magnetic flux density [T] in which the torque sensor middle point voltage (the voltages at the connection points VS1 and VS2) varies with increase in the residual magnetic flux density. In addition, when the bridge circuit 10 applies the rectangular wave AC voltage to the detection coils 40a, 40b, 40c, and 40d, voltages at the connection points S1 and S2 are either of the detection coil supply voltage 101 or the ground potential. Accordingly, the voltages at the connection points VS1 and VS2 are to be a middle voltage (2.5 V) of the detection coil supply voltage (5V) as reference.

In the comparative example, if the excitation voltages are generated from the excitation signal having the rectangular wave and generated from the inverted signal of the excitation single, at least one of the excitation signal and the inverted signal becomes a DC voltage for the predetermined interval from power on, so that a DC voltage is applied to the detection coil. Thus, a saturation current may flow through the detection coil, so that an error in measuring the torque at startup of generating the excitation signal. Thus, according to the invention, inhibiting the excitation voltages from being applied to the detection coil for the predetermined interval from the power on prevents a DC voltage from being generated in the detection coils 40a, 40b, 40c, and 40d. In the first to third embodiments, a pulse width of the excitation signal is short to such an extent that the increasing current flowing through the detection coils is not saturated.

MODIFICATIONS

The present invention may be modified as follows:

In the first to third embodiments, the excitation voltage having the rectangular wave AC voltage is applied to the detection coils 40a, 40b, 40c, and 40d. However, if the detection coils 40a, 40b, 40c, and 40d are supplied with a positive or a negative pulse voltage, a DC current is not applied to the detection coils 40a, 40b, 40c, and 40d until the switching circuit becomes stable upon startup after power on by applying no excitation voltage.

In the first to third embodiments, a differential output between the connection points VS1 and VS2 is obtained by connecting the detection coils 40c and 40d in the opposite direction relative to the detection coils 40a and 40b. However, if the detection coils 40c and 40d are connected in the same direction as the detection coils 40a and 40b, application of the torque varies the potentials in the same direction, so that the differential output becomes around zero volt. In other words, because if a trouble occurs, the voltage deviates from zero volts, so that an error detection circuit can be provided by detecting this.

According to the present invention, a magnetostrictive torque sensor is provided to avoid an excessive current flowing through the detection coil at least for the predetermined interval from the power on.

The invention claimed is:

1. A magnetostrictive torque sensor comprising:
   a shaft having a magnetostrictive film;
   a detection coil for detecting a change in a magnetic property of the magnetostrictive film to detect a torque applied to the shaft;
   a controller comprising a CPU that generates an excitation signal for generating an excitation voltage; and
   a cutoff circuit responsive to the excitation signal for applying the excitation voltage to the detection coil for detecting the change in the magnetic property of the magnetostrictive film and cutting off the excitation voltage applied to the detection coil for a predetermined interval from power on of the CPU.

2. The magnetostrictive torque sensor as claimed in claim 1, further comprising a bridge circuit including a plurality of switching elements responsive to an excitation signal for generating the excitation voltage, wherein the cutoff circuit cuts off the excitation signal supplied to the switching elements.

3. The magnetostrictive torque sensor as claimed in claim 1, wherein the cutoff circuit responds to the power on which is performed by an ignition switch.

4. The magnetostrictive torque sensor as claimed in claim 1, further comprising a controller including a timer, wherein the controller supplies a permission signal to cause the cutoff circuit to apply the excitation voltage to the detection coil when a predetermined interval measured by the timer elapses.

5. The magnetostrictive torque sensor as claimed in claim 1, further comprising a bridge circuit responsive to an excitation signal for generating the excitation voltage, wherein the cutoff circuit comprises:
   a differentiating circuit having a predetermined time constant for differentiating a rise of a supply voltage to the magnetostrictive torque sensor and a gate circuit supplied with an output of the differentiating circuit and an excitation signal for generating the excitation voltage for cutting off the excitation signal supplied to the bridge circuit for an interval determined by the predetermined time constant and a threshold of the gate circuit.

6. The magnetostrictive torque sensor as claimed in claim 1, further comprising:
   a bridge circuit for generating the excitation voltage, wherein the cutoff circuit comprises:
   a timer for measuring a predetermined interval from the power on; and
   a switch for supplying a power to the bridge circuit to generate the excitation voltage and cutting off the power to the bridge circuit for the predetermined interval measured by the timer.

7. The magnetostrictive torque sensor as claimed in claim 1, further comprising an excitation voltage generation circuit for generating the excitation voltage including pulses symmetric regarding time base and negative and positive polarities and a duration control circuit for controlling a duration of at least one of the pulses to adjust an offset of the current flowing through the detection coil.

8. The magnetostrictive torque sensor as claimed in claim 1, wherein the predetermined interval prevents a saturation current from flowing through the detection coils to prevent a saturation of the magnetic property of the magnetostrictive films.

9. The magnetostrictive torque sensor as claimed in claim 1, wherein the cutoff circuit applies at least one of the excitation voltage and an inverted excitation voltage of the excitation voltage to the detection coil for detecting the change in the magnetic property of the magnetostrictive film and cuts off at least one of the excitation voltage and the inverted excitation voltage applied to the detection coil for the predetermined interval from power on of the magnetostrictive torque sensor.

10. The magnetostrictive torque sensor as claimed in claim 1, wherein the CPU supplies a power-on permission signal when the predetermined interval has passed from power on of the CPU, wherein the cutoff circuit applies the excitation voltage to the detection coil when the cutoff circuit receives the power-on permission signal.

11. A magnetostrictive torque sensor comprising:
    a shaft having a magnetostrictive film;
    a detection coil for detecting a change in a magnetic property of the magnetostrictive film to detect a torque applied to the shaft; and
    a cutoff circuit for applying an excitation voltage to the detection coil for detecting the change in the magnetic property of the magnetostrictive film and cutting off the excitation voltage applied to the detection coil for a predetermined interval from power on of the magnetostrictive torque sensor, wherein the detection coil comprises a plurality of detection coils for detecting changes in magnetic properties of the magnetostrictive films, and the cutoff circuit applies the excitation voltage and an inverted excitation voltage of the excitation voltage to the detection coils for detecting the change in the magnetic property of the magnetostrictive film and cuts off the excitation voltage and the inverted excitation voltage applied to the detection coils for the predetermined interval from power on of the magnetostrictive torque sensor.

12. A magnetostrictive torque sensor comprising:
a shaft having a magnetostrictive film;
a detection coil for detecting a change in a magnetic property of the magnetostrictive film to detect a torque applied to the shaft;
a cutoff circuit for applying an excitation voltage to the detection coil for detecting the change in the magnetic property of the magnetostrictive film and cutting off the excitation voltage applied to the detection coil for a predetermined interval from power on of the magnetostrictive torque sensor; and
a bridge circuit including switching elements having first and second inputs receiving an excitation signal and an inverted signal of the excitation signal to generate the excitation voltage, wherein the cutoff circuit supplies the excitation signal and the inverted signal and makes the first and second input have the same level to cut off the excitation voltage for the predetermined interval from the power on.

* * * * *